Figure 1:
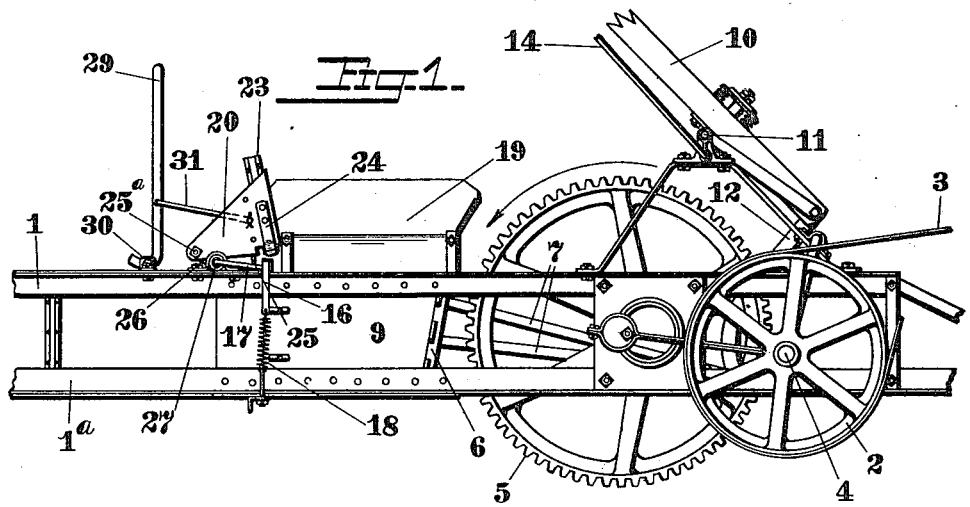

W. G. DUFFIELD.
HAY PRESS.
APPLICATION FILED JUNE 22, 1914.

1,224,288.

Patented May 1, 1917.
2 SHEETS—SHEET 1.

W. G. DUFFIELD.
HAY PRESS.
APPLICATION FILED JUNE 22, 1914.
1,224,288.
Patented May 1, 1917.
2 SHEETS—SHEET 2.
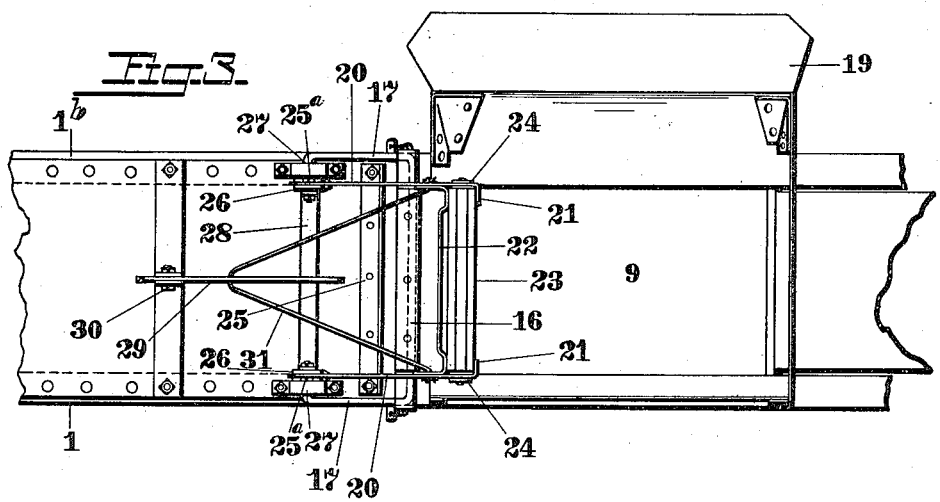
Witnesses:
Martin Peterson.
Jessie L. Simser.
Inventor:
Wayne G. Duffield

UNITED STATES PATENT OFFICE.

WAYNE G. DUFFIELD, OF MOLINE, ILLINOIS, ASSIGNOR TO THE DAIN MANUFACTURING COMPANY OF IOWA, OF OTTUMWA, IOWA, A CORPORATION OF IOWA.

HAY-PRESS.

1,224,288.

Specification of Letters Patent.

Patented May 1, 1917.

Application filed June 22, 1914. Serial No. 846,661.

*To all whom it may concern:*

Be it known that I, WAYNE G. DUFFIELD, a citizen of the United States, residing at Moline, in the county of Rock Island and State of Illinois, have invented certain new and useful Improvements in Hay-Presses, of which the following is a specification, reference being had to the accompanying drawings.

My invention relates to hay presses and has for its object to provide certain improvements therein, such improvements having to do particularly with the device for dropping the division blocks that make the separation between the bales that are formed in the bale case.

As heretofore constructed, block droppers have required considerable travel of the operating lever to shift them from normal position into dropping position, and in some cases the block holder rocked from horizontal position to vertical position. As a result of this travel of the operating lever, and block holder, or if the operator did not shift the lever at the correct moment, it frequently happened that the self feeder that knocks the division block out of the holder and into the feed chamber, would collide with the division block before the holder reached dropping position, and break and damage either the division block, the holder or the self feeder.

One of the objects of my invention is to provide a block dropper for hay presses that can be easily shifted from normal position into dropping position, and with but a slight movement of the operating lever.

A further object is to provide a block dropper that eliminates the danger of the division block being broken or the hay press damaged if the operator shifts the block dropper at the improper time.

It is also an object of my invention to provide a block dropper that is simple, strong, inexpensive and that will form a portion of the hay press hopper when it is in normal or inoperative position.

I accomplish the objects of my invention by the means shown in the drawing and as hereinafter described.

Those things that I regard as novel and of my invention will be set forth in the claims.

Figure 2:
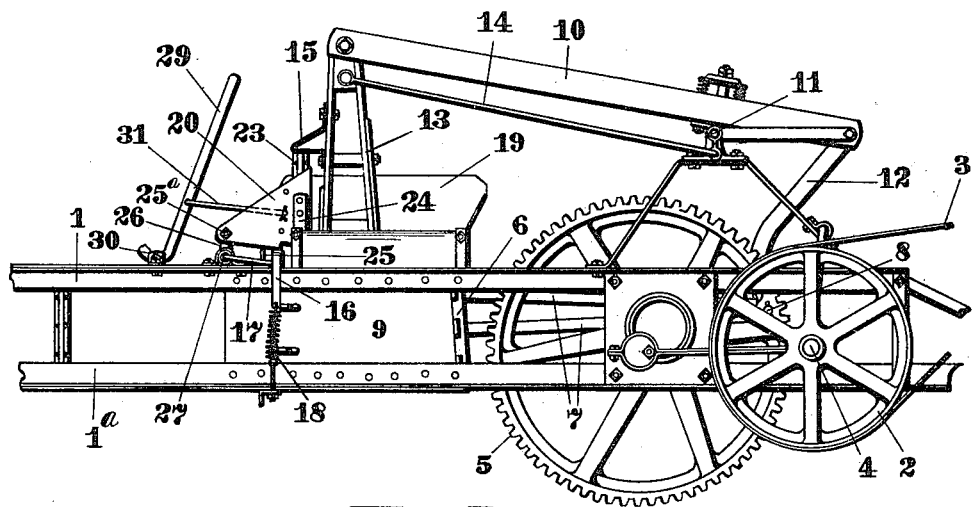

In the drawings, Figure 1 is a side elevation of a hay press showing my block dropper in normal position, portions of the bale chamber, frame and self feeder being broken away. Fig. 2 is a side elevation of a hay press showing my block dropper in dropping position, portions of the bale chamber and frame being broken away. Fig. 3 is a plan view of the block dropper in the position shown in Fig. 2, and Fig. 4 is a front elevation of the block holder.

Referring to the drawings—

1, 1ª and 1ᵇ indicate three of the four angle irons forming the rectangular bale chamber and frame of a hay press. Upon the forward portion of the frame is mounted gearing which may be of any suitable form for actuating the plunger and self feeder.

Referring to the gearing shown, 2 is a pulley with which any suitable operating power is connected by a belt 3. Upon the pulley shaft 4 is mounted a pinion that is in driving engagement with a gear 5. The plunger 6 is connected by bars 7 to a wrist pin 8 formed on the gear. As the gear is revolved the plunger 6 is caused to travel back and forth in the feed chamber portion of the frame which is designated by 9. 10 is a feeder arm pivoted at 11 upon brackets extending upwardly from the frame. A link 12 connects the feeder arm with the wrist pin 8. Upon the feeder arm is mounted a feeding head 13, the position of the feeding head relative to the feed arm being controlled by link 14. 15 is a bracket projecting from the feeder head, the purpose of which is to knock the division block out of the holder when the block dropper is shifted into dropping position. 16 represents the tucker which is held in position by the bail 17 and the spring 18. 19 is the hopper through which the hay is inserted into the feed chamber.

Referring now to the block dropper, 20 represents the sides of the block holder which are preferably made of sheet metal; the edge of the sides are bent at an angle to form the main body portion as at 21 to form flanges as best shown in Figs. 3 and 4, these flanges in connection with a cross member 22 form a receptacle for the block 23. Springs 24 having their lower ends curved inwardly are fastened to the lower sides of the block receptacle and form stops to prevent the block from slipping through the receptacle, but when pressure is applied to the block as when the bracket 15 engages therewith, the block will crowd the springs outwardly and pass through, the springs snapping back in position to hold the next block placed in the holder. The forward portion of the block holder rests upon a support 25 while the rear portion is pivoted at 25ᵃ to links 26 that are pivoted upon the bale chamber at 27. A brace 28 ties the links 26 and sides of block holder together. 29 is the operating lever for shifting the block holder from normal position to dropping position, it is pivotally supported in a bracket 30 fastened to the top of the bale chamber, and is connected to the block holder by a V-shaped link 31 that is pivoted in the lever and to the block holder sides as shown. When the block holder is in normal position as shown in Fig. 1, it forms a portion of one end of the hopper. To drop the block to make a separation between the bales, the operator shifts the lever 29 forward or toward the gears. This movement of the lever causes the top of the holder to move more rapidly than the bottom by reason of the link connection 26 and the relative location of the pivots 25ᵃ and 27. The bottom portion of the holder resting upon the support 25 moves only slightly farther than the thickness of the block while the top portion is traveling into the position shown in Fig. 2.

When it is desired to drop a block, the lever should be shifted at the time the feeding head 13 is withdrawn from the feeding chamber and is in its elevated position so that when the feeding head descends the bracket 15 will engage the top of the block and carry it out of the holder and into the feed chamber, but should the lever be shifted at the wrong time no damage will result. If the block is shifted against the bracket, the block is at an angle to the vertical and furnishes a glancing surface and will be crowded back by the bracket. At any time that the holder has been shifted far enough for the bracket to engage the top of the block, the bottom of the holder has moved into position where the block has clear entrance to the feed chamber, therefore there is no possibility of the block being crushed in the holder.

The term hay presses as used herein, is to denote the general character of the structure and it is to be understood that presses suitable for baling such materials as straw, alfalfa, excelsior, moss, etc., come within the meaning of the term.

That which I claim as my invention and desire to secure by Letters Patent is—

1. In a hay press the combination of a bale chamber, a block dropper having a block holder slidably supported at its front end, of a link connection between its rear end and the bale chamber, a lever pivotally mounted upon the bale chamber and means connecting the lever with the block holder.

2. In a hay press the combination of a bale chamber, a block holder, the front portion of the sides of the block holder slidably supported, a lever connected with the block holder to actuate the latter, link means connecting the rear portion of the block holder sides with the bale chamber to move the top of the block holder more rapidly than the bottom as the lever is operated.

3. In a hay press the combination of a bale chamber, a feed opening, a normally inclined block holder having a receptacle adapted to receive a block, means to support the forward portion of the block holder, link means connecting the rear portion of the block holder to the bale chamber, a lever mounted on the bale chamber and connected to the block holder to actuate the latter and rock the link means to move the block receptacle from normal inclined position above the bale chamber to a substantially vertical position above the feed opening.

4. In a hay press having a bale chamber, a feed opening, a horizontally reciprocating plunger, and a substantially vertical reciprocating feeder having a bracket thereon, the combination of a normally inclined block holder, a division block carried thereby, means for supporting the forward portion of the block holder, a link connection between the rear portion of the block holder and the bale chamber, a lever, a connection between the lever and block holder to shift the latter when the lever is operated and to rock the link connection to move the block holder from inclined to a substantially vertical position to place the block in the path of the bracket on the feeder.

5. In a press for baling hay or the like the combination of a bale chamber, a block holder slidably supported thereby, a link pivoted to the block holder and pivotally supported on the bale chamber, said link lying normally substantially parallel with the top of the bale chamber, a horizontally reciprocating plunger in the bale case, a feeder operating in timed relation with the plunger and adapted to reciprocate into and out of the path traversed by the plunger, and means supported on the bale chamber and connected with the block holder to move the latter toward the path traversed by the feeder.

WAYNE G. DUFFIELD.

Witnesses:
 JESSIE L. SIMSER,
 BERTHA A. MAURER.

Copies of this patent may be obtained for five cents each, by addressing the "Commissioner of Patents, Washington, D. C."